United States Patent
Huang

(10) Patent No.: US 8,820,998 B2
(45) Date of Patent: Sep. 2, 2014

(54) COMPUTER BEZEL WITH LIGHT-GUIDE STRUCTURE

(75) Inventor: Fu-Kuo Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 258 days.

(21) Appl. No.: 13/461,000

(22) Filed: May 1, 2012

(65) Prior Publication Data

US 2013/0058127 A1 Mar. 7, 2013

(30) Foreign Application Priority Data

Sep. 2, 2011 (TW) .................. 100131752

(51) Int. Cl.
*F21V 7/04* (2006.01)

(52) U.S. Cl.
USPC ........... 362/602; 362/603; 362/607; 362/633; 362/97.4

(58) Field of Classification Search
CPC ................... H01L 27/14625; H01L 31/02327; H01L 33/38; H01L 27/14629; H01L 2924/1815; H01L 51/5275; G02B 6/0068; G02B 6/0038; G02B 6/0055; G02B 6/0053; G02B 6/0036; G02B 6/0028; G02B 6/0018; G02B 6/0031; G02B 19/0014; G02B 6/00
See application file for complete search history.

*Primary Examiner* — Anh Mai
*Assistant Examiner* — Fatima Farokhrooz
(74) *Attorney, Agent, or Firm* — Novak Druce Connolly Bove + Quigg LLP

(57) ABSTRACT

A computer bezel includes a bezel body; a light-guide structure mounted to the bezel body, and one or more light sources mounted on the bezel body. The light-guide structure includes a guiding portion and a lighting portion extending from the guiding portion. The lighting portion defines an outer surface exposed out of the bezel body. The guiding portion includes a first bottom surface and a first end surface connected to the first bottom surface. An obtuse angle is defined between the first end surface and the first bottom surface. The light source corresponds to the first end surface. The guiding portion is configured to guide a plurality of light beams emitted from the one or more light sources to the lighting portion to enable the plurality of light beams to be refracted from the outer surface so as to be visible to a user.

17 Claims, 5 Drawing Sheets

COMPUTER BEZEL WITH LIGHT-GUIDE STRUCTURE

BACKGROUND

1. Technical Field

The present disclosure relates to electronic devices, and more particularly to a computer bezel with a light-guide structure.

2. Description of Related Art

Indicator lamps are used in electronic devices such as computers and testing devices. The electronic device may include a panel and a circuit board, and an indicator lamp secured to an outside surface of the panel. A light source is electronically connected to the circuit board. The indicator lamp and the light source may be arranged in a straight line, that is substantially perpendicular to the circuit board, and light beams from the light source can be directly transmitted to the indicator lamp. However, when the indicator lamp is attached to a different location, the light beams from the light source cannot be completely or efficiently transmitted to the indicator lamp. Thus, a brightness of the indicator lamp is so weak such that the indicator lamp may be nearly invisible. Therefore, an electronic device with an improved light-guide structure is desirable.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
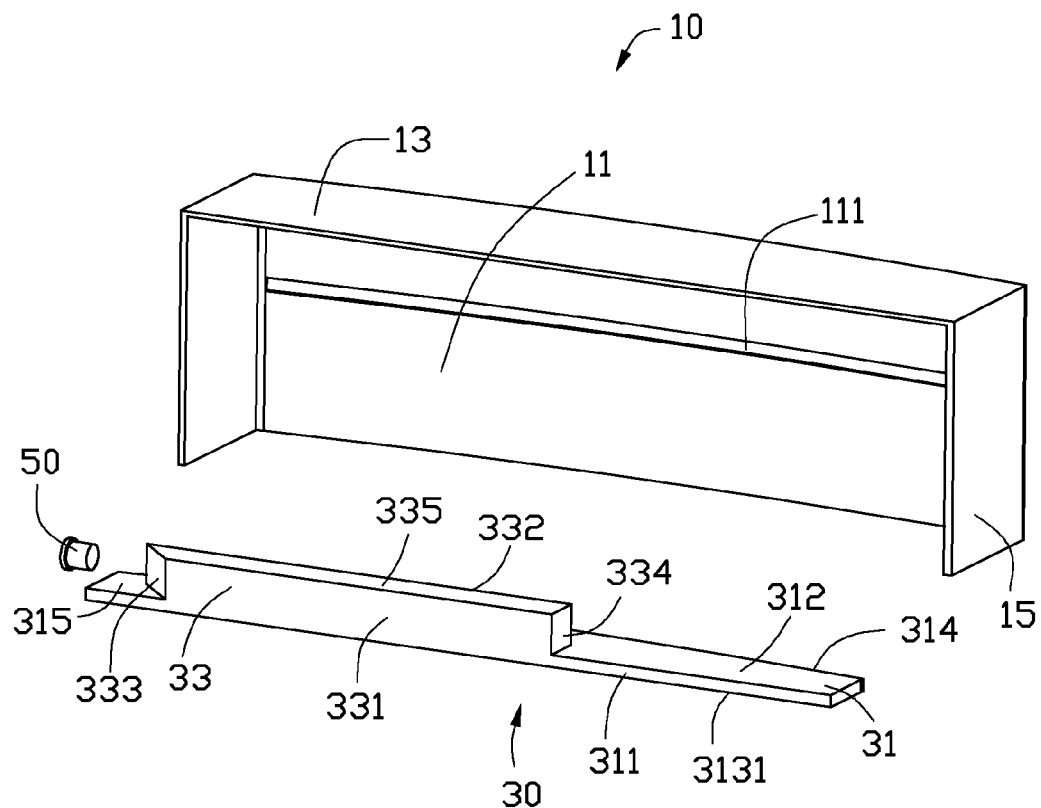
FIG. 1 is an exploded, isometric view of a computer bezel in accordance with one embodiment.

Referring to FIG. 1, a computer bezel in accordance with an exemplary embodiment includes a bezel body 10, a light-guide structure 30, and a light source 50. In one embodiment, the light source 50 is a light emitting diode (LED).

The bezel body 10 includes a front panel 11, a top panel 13 extending from the front panel 11, and two side panels 15 extending from the front pane 11. The two side panels 15 are substantially parallel to each other and substantially perpendicular to the top panel 13. The front panel 11 is curved. The front panel 11 defines an elongated opening 111.

The light-guide structure 30 includes a lighting portion 31 and a guiding portion 33 extending from the lighting portion 31. The guiding portion 33 is rectangular. The guiding portion 33 includes a first bottom surface 331, a top surface 332 substantially parallel to the first bottom surface 331, a first end surface 333, a second end surface 334, and a third end surface 335 connected between the first end surface 333 and the second end surface 334. The second end surface 334 is substantially perpendicular to the first bottom surface 331. An obtuse angle exists between the first bottom surface 331 and the first end surface 333. The lighting portion 31 includes a second bottom surface 311, a first side surface 312 extending from the second bottom surface 311, a second side surface 313 extending from the second bottom surface 311, and an outer surface 314 connected between the first side surface 312 and the second side surface 313. The second side surface 313 is substantially parallel to the first side surface 312. The outer surface 314 is configured to be received in the elongated opening 111. In one embodiment, the outer surface 314 is curved (shown in FIG. 3). The first bottom surface 331 of the guiding portion 33 and the second bottom surface 311 of the lighting portion 31 are in the same plane. The first bottom surface 331 is substantially perpendicular to the side panel 15. The length of the first bottom surface 331 is less than the length of the second bottom surface 311, in a direction substantially perpendicular to the second end surface 334. The lighting portion 31 includes an end portion 315 adjacent to the first end surface 333 of the guiding portion 33. The first side surface 312 is substantially parallel to the third end surface 335.

Figure 2:
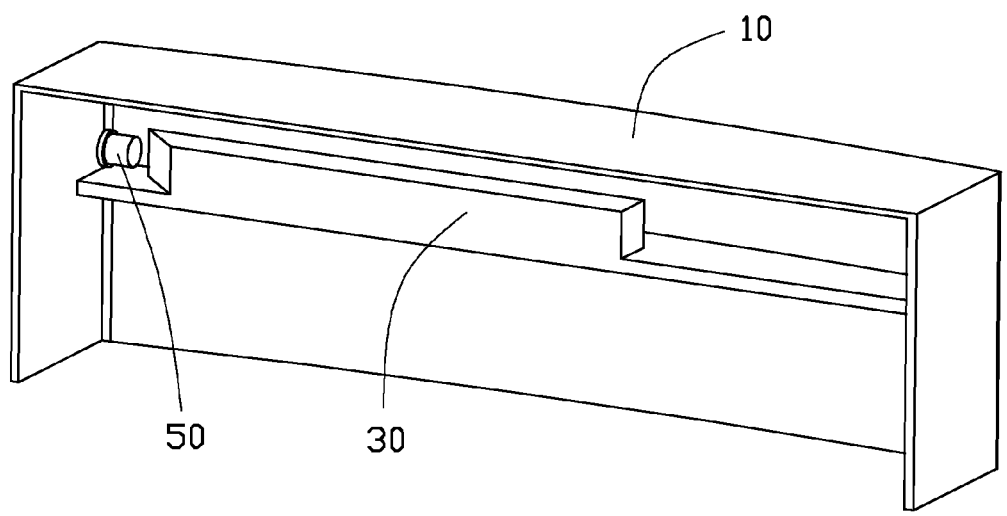
FIG. 2 is an assembled view of the computer bezel of FIG. 1.
Figure 3:
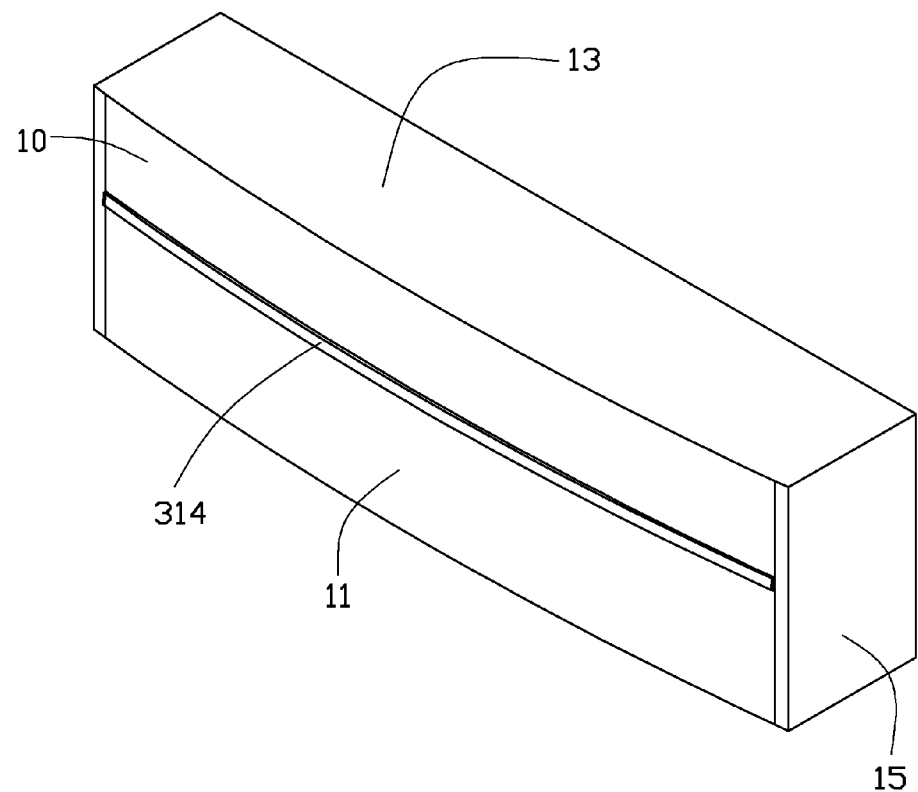
FIG. 3 is similar to FIG. 2, but viewed from another aspect.

Referring to FIGS. 2 and 3, in assembly, the lighting portion 31 of the light-guide structure 30 is received in the elongated opening 111 to enable the outer surface 314 to be exposed out of the bezel body 10. At this time, the guiding portion 33 of the light-guide structure 30 is located on the inner surface of the front panel 11. The light source 50 is mounted on the bezel body 10 and adjacent to the first end surface 333 of the guiding portion 33.

Figure 4:
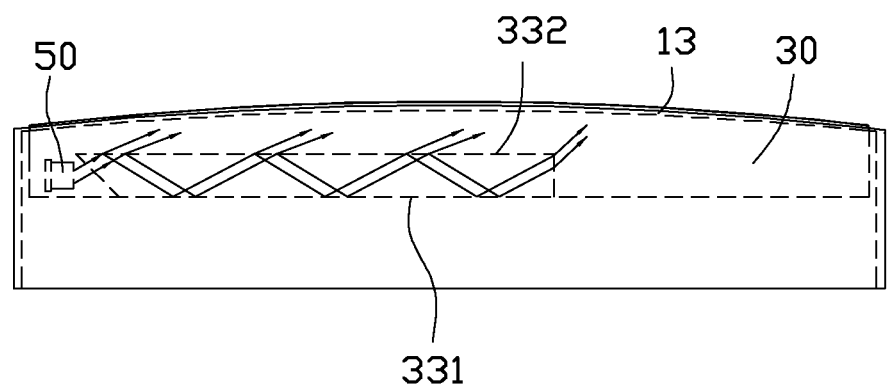
FIG. 4 is a schematic view of the light-guide structure and the light source of FIG. 1 in operation.
Figure 5:
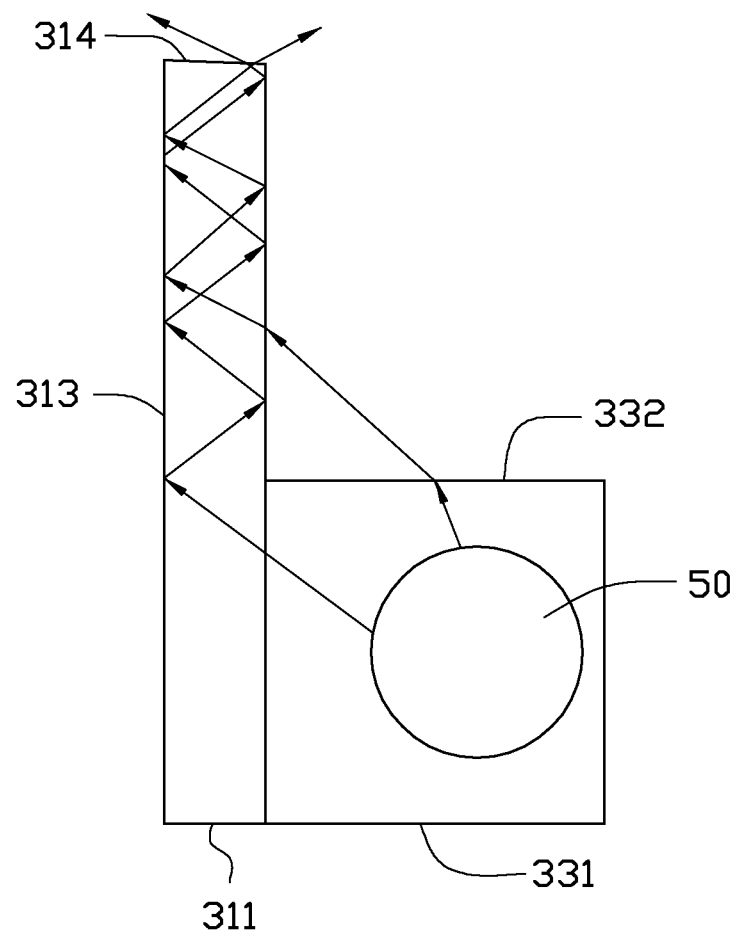
FIG. 5 is similar to FIG. 4, but viewed from another aspect.

Referring to FIGS. 4 and 5, in use, a plurality of light beams are emitted from the light source 50 into the guiding portion 33 via the first end surface 333. The first light beams are refracted to the top surface 332. The second light beams are emitted into the lighting portion 31 after being refracted by the top surface 332. Then the third light beams are refracted from the outer surface 314. The fourth light beams are emitted into the first bottom surface 331 after the reflection from the top surface 332, and are emitted into the top surface 332 after the reflection from the first bottom surface 331. The fifth light beams are emitted into the lighting portion 31 via the top surface 332. The sixth light beams are emitted to the second bottom surface 311 after the reflection from the top surface 332. Then the seventh light beams are emitted into the lighting portion 31 and refracted from the outer surface 314 so as to be visible to a user.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A computer bezel comprising:
   a bezel body;
   a light-guide structure mounted to the bezel body, the light-guide structure comprising a guiding portion and a lighting portion extending from the guiding portion; the lighting portion defines an outer surface being exposed out of the bezel body; the guiding portion comprises a first bottom surface and a first end surface connected to the first bottom surface; and an obtuse angle defined between the first end surface and the first bottom surface; and a light source mounted on the bezel body and corresponds to the first end surface;

wherein the guiding portion is configured to guide a plurality of light beams emitted from the light source to the lighting portion to enable the plurality of light beams to be refracted from the outer surface.

2. The computer bezel of claim 1, wherein the lighting portion comprises a second bottom surface, and the first bottom surface and the second bottom surface are in the same plane.

3. The computer bezel of claim 2, wherein the guiding portion comprises a second end surface substantially perpendicular to the first bottom surface.

4. The computer bezel of claim 3, wherein in a direction substantially perpendicular to the second end surface the first bottom surface is shorter than the second bottom surface.

5. The computer bezel of claim 2, wherein the lighting portion comprises a first side surface and a second side surface, extending from the second bottom surface; the first side surface is substantially parallel to the second side surface; the first side surface is connected to the guiding portion; and the outer surface is connected between the first side surface and the second side surface.

6. The computer bezel of claim 1, wherein the outer surface is arc-shaped.

7. The computer bezel of claim 1, wherein the bezel body defines an elongated opening to receive the outer surface.

8. The computer bezel of claim 7, wherein the bezel body comprises a front panel and a top panel extending from the front panel, and two side panels extending from the front panel; and the elongated opening is defined in the front panel.

9. The computer bezel of claim 8, wherein the two side panels are substantially perpendicular to the top panel.

10. A computer bezel comprising:

a bezel body, the bezel body comprising a front panel, the front panel defines an elongated opening;

a light-guide structure mounted to the bezel body, the light-guide structure comprises a guiding portion and a lighting portion extending from the guiding portion; the lighting portion defines an outer surface; the lighting portion is received in the elongated opening to enable the outer surface to be exposed out of the bezel body and enable the guiding portion to be located on an inner surface of the bezel body; the guiding portion comprises a first bottom surface and a first end surface connected to the first bottom surface; the first bottom surface is substantially parallel to the front panel; an obtuse angle is defined between the first end surface and the first bottom surface; and a light source mounted on the bezel body and corresponding to the first end surface;

wherein the guiding portion is configured to guide a plurality of light beams emitted from the light source to the lighting portion to enable the plurality of light beams to be refracted from the outer surface.

11. The computer bezel of claim 10, wherein the lighting portion comprises a second bottom surface, and the first bottom surface and the second bottom surface are in the same plane.

12. The computer bezel of claim 11, wherein the guiding portion comprises a second end surface substantially perpendicular to the first bottom surface.

13. The computer bezel of claim 12, wherein in a direction substantially perpendicular to the second end surface the first bottom surface is shorter than the second bottom surface.

14. The computer bezel of claim 11, wherein the lighting portion comprises a first side surface and a second side surface extending from the second bottom surface; the first side surface is substantially parallel to the second side surface; the first side surface is connected to the guiding portion; and the outer surface is connected to the first side surface and the second side surface.

15. The computer bezel of claim 10, wherein the outer surface is arc-shaped.

16. The computer bezel of claim 10, wherein the bezel body further comprises a top panel extending from the front panel and two side panels extending from the front panel.

17. The computer bezel of claim 16, wherein the two side panels are substantially perpendicular to the top panel.

* * * * *